(12) United States Patent
Kang et al.

(10) Patent No.: US 7,812,553 B2
(45) Date of Patent: Oct. 12, 2010

(54) LED LIGHTING DEVICE AND METHOD FOR CONTROLLING THE SAME BASED ON TEMPERATURE CHANGES

(75) Inventors: Jeong-il Kang, Yongin-si (KR); Sang-hoon Lee, Ulsan (KR); Kyoung-geun Lee, Suwon-si (KR); Jun-ho Sung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 11/727,675

(22) Filed: Mar. 28, 2007

(65) Prior Publication Data

US 2008/0079371 A1 Apr. 3, 2008

(30) Foreign Application Priority Data

Sep. 26, 2006 (KR) ............... 10-2006-0093320

(51) Int. Cl.
  G05F 1/00 (2006.01)
(52) U.S. Cl. .............. 315/309; 315/307; 315/291; 315/224; 315/247
(58) Field of Classification Search ......... 315/307–311, 315/291, 312, 149–159, 247, 224, 225, 209 R
See application file for complete search history.

(56) References Cited

U.S. PATENT DOCUMENTS

| | | | |
|---|---|---|---|
| 6,411,046 B1 * | 6/2002 | Muthu ..................... | 315/309 |
| 6,441,558 B1 * | 8/2002 | Muthu et al. ............. | 315/149 |
| 7,067,995 B2 | 6/2006 | Gunter et al. | |
| 7,262,752 B2 * | 8/2007 | Weindorf .................. | 345/82 |
| 7,391,172 B2 * | 6/2008 | Ferguson et al. ......... | 315/308 |
| 2002/0190666 A1 * | 12/2002 | Sakamoto et al. ........ | 315/291 |
| 2005/0073268 A1 * | 4/2005 | Schrodinger et al. ..... | 315/291 |
| 2005/0162099 A1 * | 7/2005 | Kemper .................... | 315/291 |
| 2006/0022616 A1 * | 2/2006 | Furukawa et al. ........ | 315/309 |
| 2006/0220571 A1 * | 10/2006 | Howell et al. ............. | 315/86 |
| 2006/0229511 A1 * | 10/2006 | Fein et al. ................. | 600/323 |
| 2007/0040512 A1 * | 2/2007 | Jungwirth et al. ........ | 315/159 |
| 2007/0132398 A1 * | 6/2007 | Ferguson et al. ......... | 315/159 |
| 2008/0191631 A1 * | 8/2008 | Archenhold et al. ..... | 315/158 |
| 2008/0215279 A1 * | 9/2008 | Salsbury et al. .......... | 702/107 |

OTHER PUBLICATIONS

Office Action from the State Intellectual Property Office of P.R China dated Apr. 13, 2010, issued in counterpart Chinese Application No. 200710102254.4.

* cited by examiner

*Primary Examiner*—Tuyet T. Vo
(74) *Attorney, Agent, or Firm*—Sughrue Mion, PLLC

(57) ABSTRACT

A Light Emitting Diode (LED) lighting device capable of correcting changes in a wavelength of light output from an LED element caused by changes in temperature, and a method for controlling the same are provided. The lighting device includes a temperature-current converter which generates a current command value to correct change in a wavelength of output light based on temperature information indicating temperature of the light source, and a light source driver which receives the current command value, adjusts amplitude of a pulse width modulation (PWM) signal, and controls a driving electric current of the light source according to the adjusted PWM signal.

21 Claims, 4 Drawing Sheets

LED LIGHTING DEVICE AND METHOD FOR CONTROLLING THE SAME BASED ON TEMPERATURE CHANGES

CROSS-REFERENCE TO RELATED APPLICATIONS

This application claims priority under 35 U.S.C. §119(a) of Korean Patent Application No. 10-2006-0093320, filed in the Korean Intellectual Property Office on Sep. 26, 2006, the entire disclosure of which is incorporated herein by reference.

BACKGROUND OF THE INVENTION

1. Field of the Invention

Apparatuses and methods consistent with the present invention relate to a lighting device and a method for controlling the same. More particularly, the present invention relates to a Light Emitting Diode (LED) lighting device capable of correcting a change of wavelength of light output from an LED element according to changes in temperature, and a method for controlling the same.

2. Description of the Related Art

The technology related to using solid semiconductor light sources, such as LEDs and Laser Diodes (LDs), for image display devices has been vigorously researched. In particular, an LED backlight device using an LED having three colors, such as red, green and blue (R, G, B), which can be used to represent a wide spectrum of colors, has become popular as a backlight device for LCD image display devices.

FIG. 1A is a block diagram illustrating the configuration of a conventional LED backlight device. As shown in FIG. 1A, the conventional LED backlight device comprises a pulse width modulation (PWM) generator 110, an LED driver 120 and an LED light source 130.

The PWM generator 110 generates PWM signals in duty ratios suitable for each of R, G and B LED arrays which constitute the LED light source 130, and inputs the PWM signals to R, G and B drivers respectively in the LED driver 120. The duty ratio indicates the ratio of a cycle of the PWM signal to the on time of the PWM signal. The LED driver 120 supplies electric current to the LED light source 130 according to the input PWM signal and, thus, emits light from the LED light source 130.

In order to improve the image quality and reduce power consumption, dimming the luminance of the LED backlight device is required. FIG. 1B is a view provided to describe representative LED luminance dimming methods, an analog dimming (A_dim) method and a PWM dimming (P_dim) method. As shown in FIG. 1B, an analog dimming method adjusts the luminance of the LED element by modifying the intensity (amplitude) of an electric current of a PWM pulse supplied to the LED element, and a PWM dimming method adjusts the average electric power supplied to the LED element by modifying the ratio of on-off of a PWM pulse.

Meanwhile, emission features such as the luminance and wavelength of the LED element in LED back light devices depend on changes in temperature. In order to correct the emission features caused by changes in temperature, a PWM dimming method can be used. A PWM dimming method, however, still has problems due to the change of the wavelength of the aforementioned light output from the LED element, because the change of the wavelength of the output light is not corrected.

Therefore, a light emitting device maintaining the desired chromaticity by correcting the change of the wavelength according to changes in the temperature is desired.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, an aspect of the present invention provides a LED lighting device capable of correcting a change of wavelength of light output from an LED element according to changes in temperature, and a method for controlling the same.

According to another aspect of the present invention, a lighting device is provided, comprising a temperature-current converter which generates a current command value based on temperature information indicating a temperature of a light source, and a light source driver which receives the current command value, adjusts an amplitude of a pulse width modulation (PWM) signal, and controls a driving electric current of the light source according to the adjusted PWM signal.

The current command value may be generated to correct for changes in a wavelength of output light caused due to the temperature change of the light source.

The light source driver may comprise a compensator which receives the current command value and an electric current used to drive the light source, adjusts the amplitude of the PWM signal, and outputs the adjusted PWM signal, and a switching unit which controls an electric current supplied to the light source according to the adjusted PWM signal.

The temperature-current converter may comprise a lookup table which stores current command values corresponding to temperatures of the light source.

The temperature-current converter may generate the current command value using a function indicating a correlation between the temperature of the light source and the current command value.

The device may further comprise a temperature detector which detects the temperature of the light source and provides the temperature information to the temperature-current converter.

The light source may comprise Light Emitting Diode (LED) elements.

The light source may also comprise Laser Diode (LD) elements.

The lighting device may comprise an LCD backlight device.

According to another exemplary embodiment of the present invention, a method is provided for controlling a lighting device. The method comprises generating a current command value based on temperature information indicating a temperature of a light source, adjusting an amplitude of a pulse width modulation (PWM) signal to supply an electric current to the light source according to the current command value, and supplying an electric current to the light source according to the adjusted PWM signal.

BRIEF DESCRIPTION OF THE DRAWINGS

These and/or other aspects and features of the invention will become apparent and more readily appreciated from the following description of the exemplary embodiments, taken in conjunction with the accompanying drawings of which.

DETAILED DESCRIPTION OF EXEMPLARY EMBODIMENTS OF THE PRESENT INVENTION

Figure 1A:
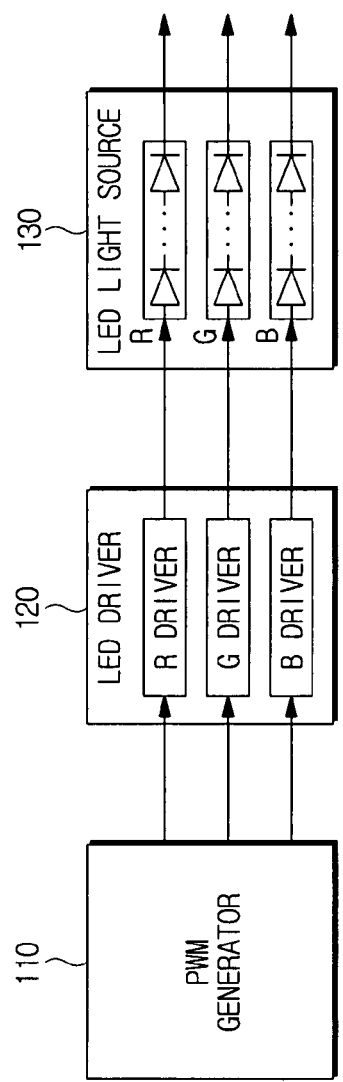
FIG. 1A is a block diagram illustrating the configuration of an LED backlight device in the related art.
Figure 1B:
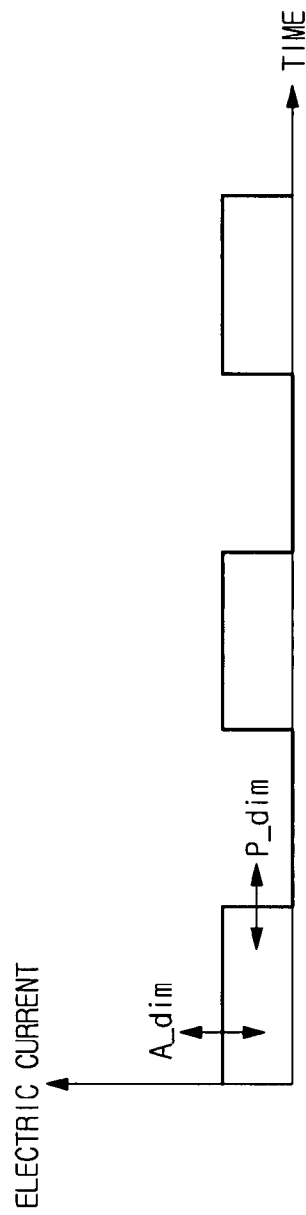
FIG. 1B is a view provided to describe an analog dimming method and a PWM dimming method.

Reference will now be made in detail to the exemplary embodiments of the present invention, examples of which are illustrated in the accompanying drawings, wherein like reference numerals refer to like elements throughout. The exemplary embodiments are described below in order to explain the various aspects of the present invention by referring to the figures.

Hereinbelow, certain exemplary embodiments of the present invention will be described in detail with reference to the accompanying drawings. The drawings illustrate elements related to the present invention from among the elements constituting an LED lighting device. The present invention is not limited to the exemplary embodiments of an LED lighting device according to the present invention. For example, the present invention may include a lighting device using solid semiconductor light sources such as an LD as well as an LED element.

Figure 2:
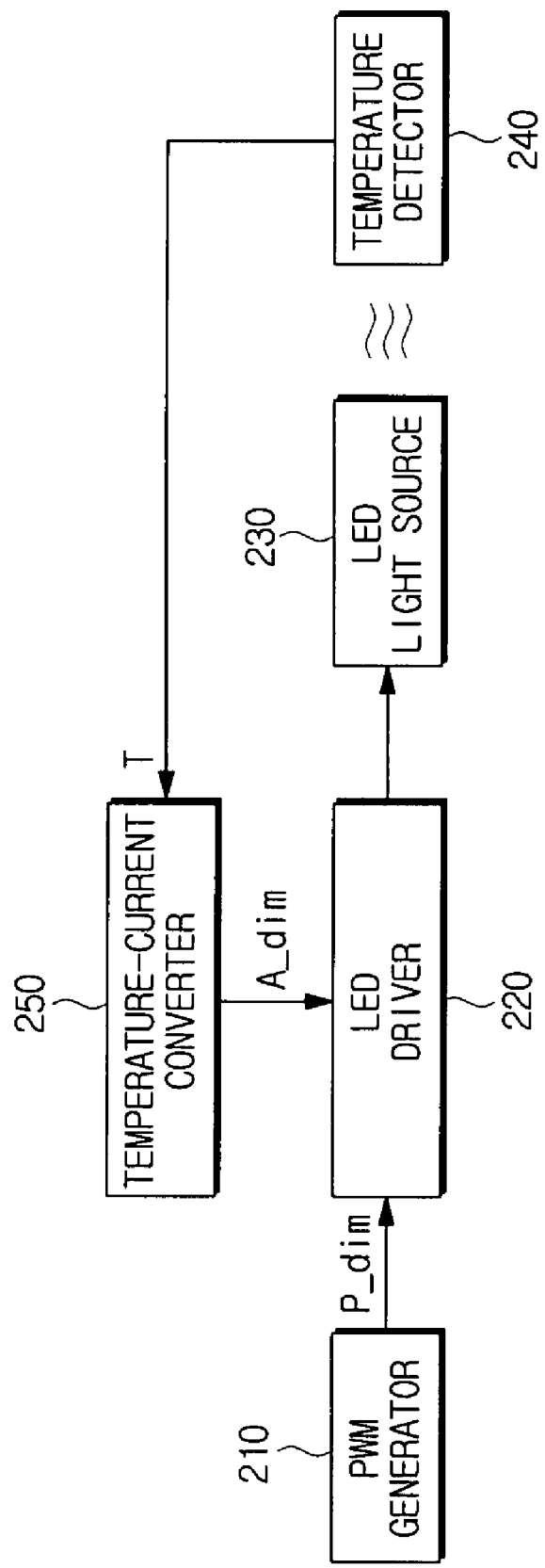
FIG. 2 is a block diagram illustrating the configuration of an LED lighting device according to an exemplary embodiment of the present invention.

FIG. 2 is a block diagram illustrating the configuration of an LED lighting device according to an exemplary embodiment of the present invention. The LED lighting device comprises a PWM generator 210, an LED driver 220, an LED light source 230, a temperature detector 240 and a temperature-current converter 250.

The PWM generator 210 generates PWM signals to drive R, G and B LED arrays of the LED light source 230, and inputs the PWM signals to the LED driver 220. The PWM signals are pulse width modulated signals to maintain the optimum level in luminance and chromaticity for the R, G and B LED arrays.

The LED driver 220 supplies driving electric currents to each of the R, G and B LED arrays of the LED light source 230 according to the PWM signals output from the PWM generator 210 so as to emit light from the LED light source 230. Moreover, the LED driver 220 alters the amplitude of the PWM pulse according to a current command value input from the temperature-current converter 250, and supplies electric current to the LED light source 230 using the altered PWM signal.

The LED light source 230 comprises R, G and B LED elements and also may comprise LED elements of other colors. Further, the LED light source 230 may be configured with a combination of LED elements and other light sources.

The temperature detector 240 detects the temperature of the LED light source 230 and generates temperature information corresponding to the detected temperature. The temperature detector 240 may be a Negative Temperature Coefficient (NTC) thermistor, a Positive Temperature Coefficient (PTC) thermistor, a thermoelement or the like.

The temperature-current converter 250 receives the temperature information T indicating the temperature of the LED light source 230 output from the temperature detector 240, converts the temperature information T to a current command value to offset the change of wavelength of light output from the LED element due to changes in temperature, and inputs the current command value to the LED driver 220.

The temperature-current converter 250 may store data correlating the temperature of the light source with the current command value to correct for the change of the wavelength due to temperature. This data may be, for example, stored in a lookup table form in a memory. In this case the temperature-current converter 250 reads out a current command value corresponding to the temperature detected in the temperature detector 240 when operating the lighting device, and outputs the read current command value to the LED driver 220. Alternatively, if a relational expression between electric current and the wavelength of the light source and a relational expression between the temperature and the wavelength of the light source is known, a relational expression between the temperature and the electric current command value is deduced in order to correct the wavelength of light output from the light source. In this case, a current command value can be generated using the deduced relational expression. Subsequently, the LED driver 220 alters the amplitude of a PWM pulse according to the current command value input from the temperature-current converter 250 and supplies an electric current to the LED light source 230 using the PWM signal having the altered amplitude.

Figure 3:
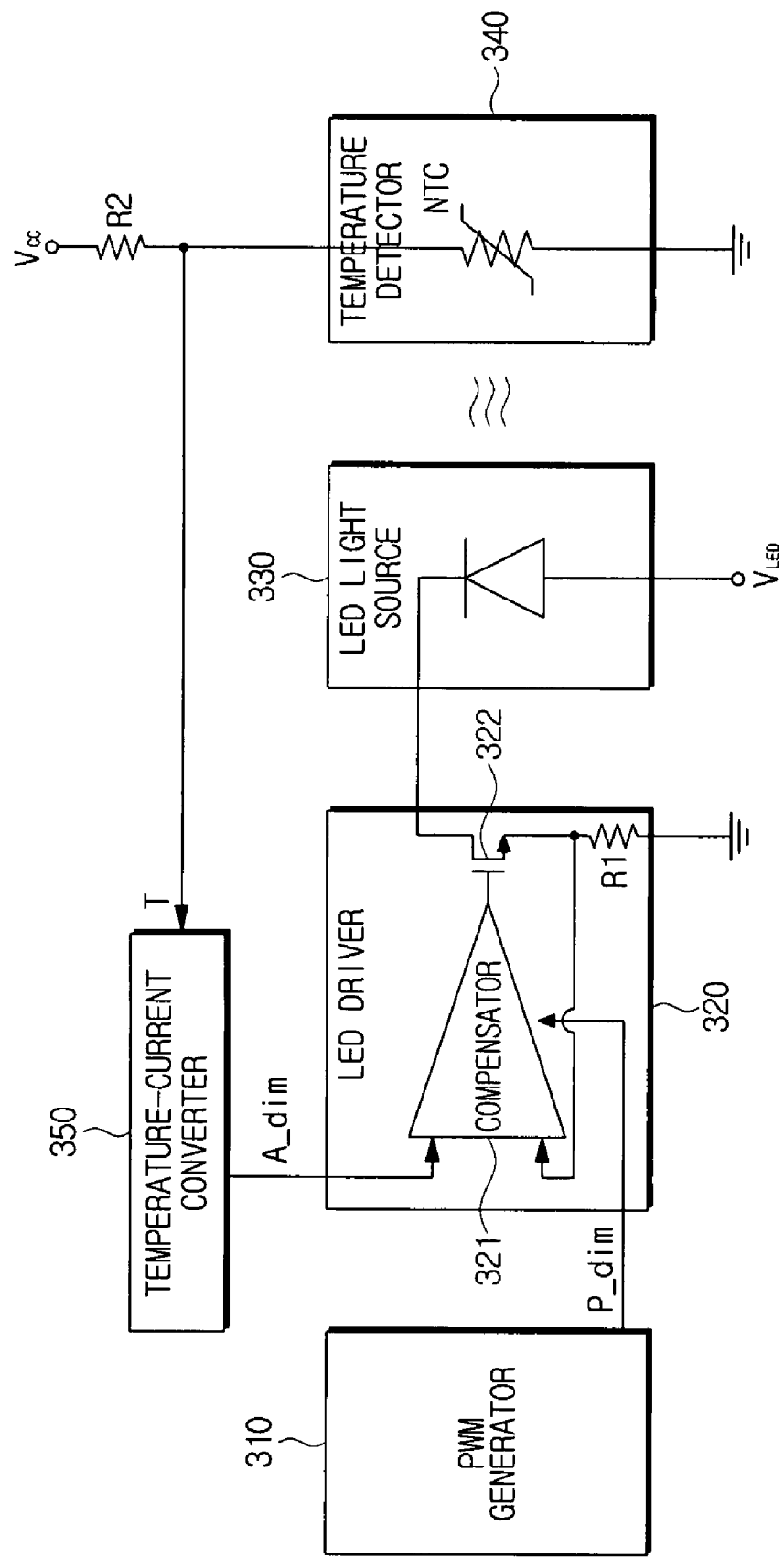
FIG. 3 is a detailed block diagram illustrating the configuration of an LED lighting device according to an exemplary embodiment of the present invention.

FIG. 3 is a detailed block diagram illustrating the configuration of an LED lighting device which corrects the wavelength of light output from a light emitting element in accordance with changes in the temperature according to an exemplary embodiment of the present invention. The LED lighting device comprises a PWM generator 310, an LED driver 320, an LED light source 330, a temperature detector 340 and a temperature-current converter 350. The LED driver 320 and LED light source 330 of FIG. 3 are illustrated having only one LED element and one driver to drive the LED element in order to facilitate the description, however, the present invention is not so limited. The PWM generator 310, the temperature-current converter 350 and the LED light source 330 of FIG. 3 have the same configuration as those of FIG. 2, so detailed description thereof is omitted.

The temperature detector 340 is configured with an NTC thermistor in which the resistance drops when the temperature rises, and vice versa. As the resistance of the NTC thermistor varies according to the temperature of the LED light source 330, the voltage value of the contact between the NTC thermistor 340 and the resistance R2 likewise varies. The voltage value is input into the temperature-current converter 350 as temperature information.

The LED driver 320 comprises a compensator 321, a MOS field effect transistor (MOSFET) 322 and a resistor R1. The compensator 321 receives the electric current value detected through the resistor R1 and the current command value output from the temperature-current converter 350 and carries out analog dimming to control the amplitude of the PWM signal. Consequently, the electric current value supplied to the LED light source 330 is the same as the current command value. For example, it is assumed that an electric current necessary for the LED light source 330 to correct the change of the wavelength caused due to temperature change of the LED light source 330 is 1 mA. However, if an electric current which is detected at the contact between the resistor R1 and the MOSFET 322 and fed back to the compensator 321 is 0.8 mA, the compensator 321 increases the amplitude of the PWM pulse, so the electric current flowing into the MOSFET 322 becomes 1 mA. The PWM signal output from the compensator 321 is transmitted to a gate of the MOSFET 322, which is a switching element to adjust a driving electric current supplied to the LED light source 330 according to the on/off cycle of the PWM pulse signal. This exemplary embodiment of the present invention uses a linear method LED driver, but the present invention is not limited thereto. For example, the LED driver may be configured with a driver using a switching method.

The LED lighting device according to another exemplary embodiment of the present invention alters the amplitude of the PWM signal using a current command value to correct the wavelength, and corrects the change of the wavelength of light output from the lighting device caused due to a change in temperature. As a result, the wavelength is maintained uniformly.

Figure 4:
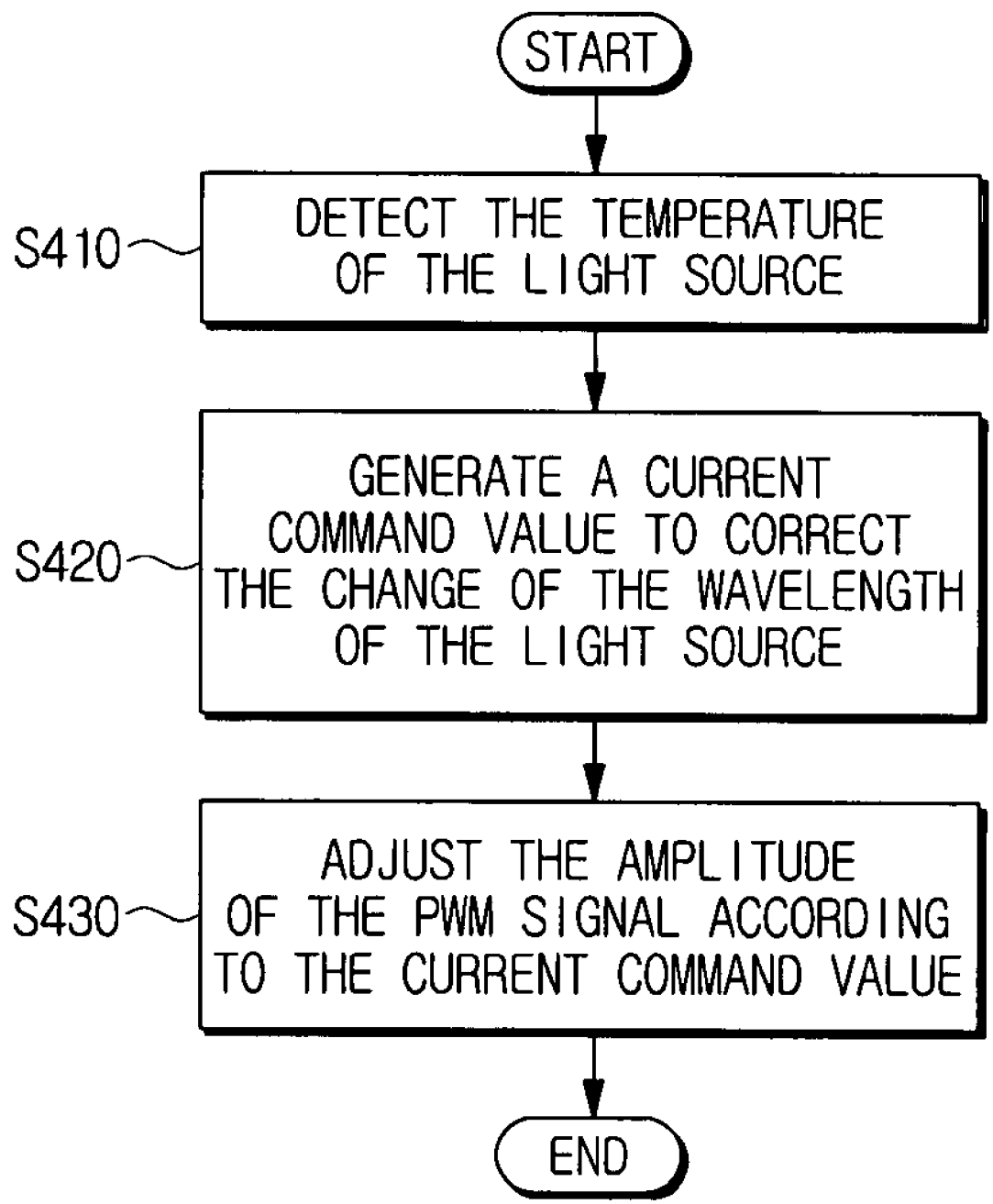
FIG. 4 is a flow chart illustrating a method for controlling an LED lighting device according to an exemplary embodiment of the present invention.

FIG. 4 is a flow chart illustrating a method for controlling an LED lighting device according to an exemplary embodiment of the present invention.

Referring to FIGS. 2 and 4, the temperature detector 240 detects the temperature of the LED light source 230 and outputs temperature information regarding the detected temperature (S410).

The temperature-current converter 250 generates a current command value to correct the change of the wavelength of the LED light source 230 using a correlation between the temperature information and the wavelength of light output from the LED light source 230, and inputs the current command value to the LED driver 220 (S420).

The LED driver 220 adjusts the amplitude of the PWM signal according to the current command value and supplies a driving electric current to the LED light source 230 (S430).

The LED light source 230 emits light according to the electric current supplied by the LED driver 220.

As can be appreciated from the above description, an LED lighting device according to an exemplary embodiment of the present invention corrects the change of the wavelength of a light source caused by a change in temperature, using a combination of a PWM dimming method and an analog dimming method. Accordingly, changes in color coordinates and image quality, or errors in color control, may be prevented.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A lighting device, comprising:
a temperature-current converter which generates a current command value based on temperature information indicating a temperature of a light source; and
a light source driver which receives the current command value, adjusts an amplitude of a pulse width modulation (PWM) signal, and controls a driving electric current of the light source according to the adjusted PWM signal,
wherein the temperature-current converter generates the current command value using a function indicating a correlation between the temperature of the light source and the current command value.

2. The lighting device according to claim 1, wherein the current command value is generated to correct for changes in a wavelength of output light caused by a temperature change of the light source.

3. The device of claim 1, wherein the light source driver comprises:
a compensator which receives the current command value and an electric current used to drive the light source, adjusts the amplitude of the PWM signal, and outputs the adjusted PWM signal; and a switching unit which controls the driving electric current supplied to the light source according to the adjusted PWM signal.

4. The device of claim 1, wherein the light source comprises Light Emitting Diode (LED) elements.

5. The device of claim 1, wherein the light source comprises Laser Diode (LD) elements.

6. The device of claim 1, wherein the lighting device is an LCD backlight device.

7. The light device according to claim 1, wherein the amplitude of the PWM signal is adjusted based on the current command value.

8. The device of claim 1, further comprising:
a temperature detector which detects the temperature of the light source and provides the temperature information to the temperature-current converter.

9. The device of claim 8, wherein the temperature detector is a negative temperature coefficient (NTC) thermistor.

10. The device of claim 8, wherein the temperature detector is a positive coefficient (PTC) thermistor.

11. The device of claim 8, wherein the temperature detector is a thermoelement.

12. A lighting device, comprising:
a temperature-current converter which generates a current command value based on temperature information indicating a temperature of a light source; and
a light source driver which receives the current command value, adjusts an amplitude of a pulse width modulation (PWM) signal, and controls a driving electric current of the light source according to the adjusted PWM signal,
wherein the temperature-current converter comprises a lookup table which stores current command values corresponding to temperatures of the light source, said temperature-current converter reads a current command value from the lookup table and outputs the read current command value to an Light Emitted Diode (LED) driver.

13. A method for controlling a lighting device, comprising:
generating a current command value based on temperature information indicating a temperature of a light source;
adjusting an amplitude of a pulse width modulation (PWM) signal according to the current command value;
supplying an electric current to the light source according to the adjusted PWM signal, and
generating the current command value using a function indicating a correlation between the temperature of the light source and the current command value.

14. The method of claim 13, wherein the current command value is generated to correct for changes in a wavelength of output light caused by a temperature change of the light source.

15. The method of claim 13, wherein the adjusting the amplitude of the PWM signal comprises adjusting the amplitude of the PWM signal based on both the current command value and an electric current used to drive the light source.

16. The method of claim 13, further comprising:
detecting the temperature of the light source and generating the temperature information.

17. The method of claim 13, wherein the light source comprises Light Emitting Diode (LED) elements.

18. The method of claim 13, wherein the light source comprises Laser Diode (LD) elements.

19. The method of claim 13, wherein the lighting device is an LCD backlight device.

20. A lighting device, comprising:
a temperature-current converter which generates a current command value based on temperature information indicating a temperature of a light source; and a light source driver which receives the current command value, adjusts an amplitude of a pulse width modulation (PWM) signal, and controls a driving electric current of the light source according to the adjusted PWM signal, wherein said current command values are generated based on a relational expression between the electric current and a wavelength of the light source and a relational expression between the temperature and the wavelength of the light source.

21. A method for controlling a lighting device, comprising:

generating a current command value based on temperature information indicating a temperature of a light source;

adjusting an amplitude of a pulse width modulation (PWM) signal according to the current command value;

supplying an electric current to the light source according to the adjusted PWM signal, and wherein said current command values are generated based on a relational expression between the electric current and a wavelength of the light source and a relational expression between the temperature and the wavelength of the light source.

* * * * *